United States Patent [19]
Lutter et al.

[11] Patent Number: 5,739,173
[45] Date of Patent: Apr. 14, 1998

[54] PREPARATION OF FLAME-RESISTANT SOFT POLYURETHANE FOAMS OF REDUCED SMOKE DENSITY, AND MELAMINE/EXPANDABLE GRAPHITE/POLYETHER-POLYOL DISPERSIONS FOR THIS PURPOSE

[75] Inventors: Heinz-Dieter Lutter, Neckargemuend; Ruth Zschiesche, Mannheim; Hans-Jürgen Gabbert, Wildeshausen; Volker Hasse, Schoengeising; Karl Fimmel, Brakel, all of Germany

[73] Assignee: BASF Aktiengesellschaft, Ludwigshafen, Germany

[21] Appl. No.: 531,114

[22] Filed: Sep. 20, 1995

Related U.S. Application Data

[63] Continuation of Ser. No. 229,853, Apr. 19, 1994, abandoned, which is a continuation of Ser. No. 44,868, Apr. 8, 1993, abandoned, which is a continuation of Ser. No. 780,589, Oct. 23, 1991, abandoned.

[30] Foreign Application Priority Data

Oct. 26, 1990 [DE] Germany .................. 40 34 046.5

[51] Int. Cl.$^6$ .................................. C08G 18/14
[52] U.S. Cl. ................ 521/99; 521/100; 521/106; 521/123; 521/127; 521/128; 524/589; 524/590; 524/591
[58] Field of Search ................ 521/99, 100, 106, 521/123, 127, 128; 524/589, 590, 591

[56] References Cited

U.S. PATENT DOCUMENTS 4,977,194  12/1990  Haas et al. .................. 521/99

Primary Examiner—Duc Truong
Attorney, Agent, or Firm—Fernando A. Borrego

[57] ABSTRACT

A process for the preparation of flame-resistant soft polyurethane foams which produce less smoke in the event of fire involves reacting a) an organic polyisocyanate and/or a modified organic polyisocyanate with b) a high-molecular-weight compound containing at least two reactive hydrogen atoms and, if desired, c) a chain extender and/or crosslinking agent, in the presence of d) a mixture of flameproofing agents which contains:
   di) melamine
   dii) expandable graphite and, if desired,
   diii) at least one further flameproofing agent, preferably a modified or unmodified ammonium polyphosphate.

e) a blowing agent, f) a catalyst and, if desired, g) assistants and/or additives, and melamine/expandable graphite/polyether-polyol dispersions which are suitable for this purpose.

19 Claims, No Drawings

PREPARATION OF FLAME-RESISTANT SOFT POLYURETHANE FOAMS OF REDUCED SMOKE DENSITY, AND MELAMINE/EXPANDABLE GRAPHITE/ POLYETHER-POLYOL DISPERSIONS FOR THIS PURPOSE

This is a continuation of application Ser. No. 08/229,853 filed Apr. 19, 1994 now abandoned, which is a continuation of Ser. No. 08/044,868, filed Apr. 8, 1993 now abandoned, which is a continuation of Ser. No. 07/780,589 filed Oct. 23, 1991 now abandoned.

The present invention relates to a process for the preparation of flame-resistant soft polyurethane foams (also abbreviated to soft PU foams below) which produce less smoke in the event of fire. The flameproofing agents used according to the invention for the preparation of the soft PU foams are melamine, expandable graphite and, if desired, at least one further flameproofing agent.

The preparation of soft PU foams is known and is described in numerous patents and other publications, for example, the Kunststoff-Handbuch, Volume VII, Polyurethane, Carl Hanser Verlag, Munich, 1st Edition, 1966, edited by Dr. R. Vieweg and Dr. A. Höchtlen, and 2nd Edition, 1983, edited by Dr. G. Oertel.

Soft PU foams are usually prepared using commercially available tolylene diisocyanates as the polyisocyanates, polyoxyalkylene-polyols based on 1,2-propylene oxide and/or ethylene oxide and mixtures of polyoxyalkylene-polyols of this type and graft polyoxyalkylene-polyols as the polyfunctional high-molecular-weight-compounds, and alkanediols or hydroxyl- and/or amino-containing compounds having a functionality of greater than 2, eg. glycerol or alkanolamines, as the chain extender.

Soft foams of this type are not flame resistant; a particular disadvantage is their ready flammability. In order to minimize this disadvantage, the foamable PU mixtures are mixed with flameproofing agents, preferably halogen- and/or phosphorus-containing compounds. However, the addition of these products frequently has an adverse effect on the mechanical properties of the soft PU foams obtained. There has therefore been no lack of attempts to develop novel flameproofing agents to replace all or some of the halogen- and/or phosphorus-containing compounds in soft PU foams.

An example of a compound said to be suitable for this purpose is polyfunctional melamine which melts at 354° C. According to DE-A-23 48 838, the melamine is suspended in the polyol and/or polyisocyanate component, and the suspension obtained is immediately processed to give an isocyanurate-containing, flame-resistant PU plastic. According to U.S. Pat. No. 4,221,875 (DE-A-28 09 084), nonflammable rigid PU foams are obtained by reacting an organic polyisocyanate and a polyoxyalkylene-polyol in the presence of a blowing agent and a silicone as surface-active additive and from 20 to 100 parts by weight of melamine as flameproofing agent per 100 parts by weight of polyoxyalkylene-polyol.

EP-A-0 004 618 (U.S. Pat. No. 4,258,141) describes a process for the preparation of low-flammability soft PU foams using a mixture of diphenylmethane diisocyanates and polyphenyl-polymethylene polyisocyanates (crude MDI) containing from 40 to 90% by weight of diphenylmethane diisocyanate isomers, based on the total weight, as the polyisocyanate, and cyanuric acid derivatives, in particular melamine, as the flameproofing agent.

Although this process significantly improved the flame resistance of the soft PU foams, the considerable sedimentation of the melamine in the polyol which occurs even after a short storage time must be regarded as a disadvantage. To overcome this disadvantage, EP-B-023 987 (U.S. Pat. No. 4,293,657) describes stable melamine/polyol dispersions in which the melamine is comminuted in situ in the polyol in the presence of one or more stabilizers to a particle size of less than 10 μm at a local energy density of from 10 to 3000 kW/m$^3$. This additional measure requires complex equipment and is expensive.

The use of expandable graphite, alone or in combination with other flameproofing agents, for the preparation of flame-resistant rigid and soft PU foams has furthermore been disclosed.

According to EP-A-0 192 888 (U.S. Pat. No. 4,698,369), the flameproofing agent used for the preparation of flexible PU-polyether foams is expandable graphite. These foams have the disadvantage of a considerable wick effect due to the graphite component, which results in smouldering, the formation of a large amount of fly ash and the formation of a residue from burning which is finely powdered and easily forms a dust.

In order to avoid this disadvantage, DE-A-38 28 544 uses polymer dispersions prepared by reacting monoisocyanates and/or polyisocyanates with primary and/or secondary amino-containing polyamines and/or hydrazines and/or hydrazides and/or alkanolamines in a compound containing from 1 to 8 primary and/or secondary hydroxyl groups and having a molecular weight of from 400 to 16,000 as the high-molecular-weight polyhdydroxyl compound and in a combination of a graphite modified by inorganic expandable materials and an inorganic flameproofing co-agent, preferably ammonium polyphosphate, calcium cyanamide, aluminum oxide hydrate or calcium carbonate. Preference is given to graphites modified by sulfuric acid, nitrate or fluoride. Since the suitable polymer dispersions must be prepared by a special process, the products are relatively expensive.

According to DE-A-38 12 348, the abovementioned polymer dispersions can also be replaced as high-molecular-weight compounds containing at least two reactive hydrogen atoms by polyesters, polycarbonates, polylactones and/or polyamides. Due to the relatively high-viscosity compounds containing bonded ester groups and having molecular weights of from 400 to 10,000, the formulations can only be processed with difficulty in conventional equipment for the production of foam moldings.

It is an object of the present invention to further improve the flame resistance of soft PU foams while simultaneously reducing the amount of smoke produced in the event of fire. The melamine-containing formations should have a long pot life, at least over the processing time, should have relatively low viscosity, good flow properties, be homogeneous and readily processable by the two-component high- or low-pressure foaming process.

We have found that, surprisingly, these objects are achieved by using melamine and expandable graphite as the flameproofing agent.

The present invention accordingly provides a process for the preparation of a flame-resistant soft polyurethane foam having reduced smoke density, by reacting a) an organic polyisocyanate and/or a modified organic polyisocyanate with b) a high-molecular-weight compound containing at least two reactive hydrogen atoms, preferably a polyether-polyol, and c) if desired, a low-molecular-weight chain extender, in the presence of d) a flameproofing agent, e) a blowing agent, f) a catalyst and, if desired, g) assistants and/or additives, wherein the flameproofing agent (d) is melamine and expandable graphite.

The present invention furthermore provides the melamine/expandable graphite/polyether-polyol dispersion which is suitable for the preparation of the flame-resistant, soft PU foams and comprises from 5 to 100 parts by weight of melamine, from 0.1 to 35 parts by weight of expandable graphite and 100 parts by weight of one or more polyether-polyols or polymer-modified polyether-polyols, or a mixture thereof, having a functionality of from 2 to 3 and a molecular weight of from 3600 to 6500.

The use of melamine in combination with expandable graphite as the flameproofing agent and the use of a high-molecular-weight polyether-polyol gives system components whose viscosity has been significantly reduced compared with conventional systems having corresponding solids contents. Even minor amounts of added expandable graphite stabilize the melamine/polyether-polyol dispersion to a significant extent. Together with improved flow properties, the system components can be processed equally well in high-pressure and low-pressure foaming equipment to give soft PU foam moldings.

The soft PU foams or preferably soft PU foam moldings have good flame resistance and, in the event of fire, produce less smoke. Measurements of the flame resistance using the kerosine burner test of FAR 25 853 C and the smoke density in accordance with ASTM E 662-79 standard test method for specific optical density of smoke generated by solid materials, which corresponds to the Airbus Transport Specification (ATS 1000.001), on the soft PU foams prepared according to the invention gave significantly better results than soft PU foams in which the only flameproofing agent is melamine in the corresponding amounts. In spite of the relatively high melamine content, the soft PU foams have good mechanical properties, in particular tensile strength, tear propagation strength and elongation, and good results in the DIN 53574 fatigue test.

The following applies to the starting components which can be used for the process according to the invention;

a) Suitable polyisocyanates for preparing the flame-resistant soft PU foams, preferably the soft PU foam molding, are conventional organic, eg. aliphatic, cycloaliphatic, araliphatic, cycloaliphatic-aromatic and preferably aromatic diisocyanates and/or polyisocyanates. Specific examples of aromatic polyisocyanates are mixtures of 4,4'- and 2,4'-diphenylmethane diisocyanates (MDI), mixtures of MDI isomers and polyphenyl-polymethylene polyisocyanates, so-called crude MDI, expediently containing 50% by weight or more, preferably from 60 to 90% by weight or more, based on the total weight of the mixture, of MDI isomers, 2,4- and 2,6-tolylene diisocyanates and the corresponding commercially available isomer mixtures, mixtures of 2,4- and 2,6-tolylene diisocyanates and MDI, preferably 4,4'- and 2,4'-MDI and/or crude MDI, for example those containing from 30 to 90% by weight, preferably from 40 to 80% by weight, based on the total weight of the crude MDI, of MDI. Also suitable are modified polyisocyanates, ie. products obtained by the chemical reaction of organic diisocyanates and/or polyisocyanates. Examples are ester-, urea-, biuret-, allophanate-, isocyanurate- and preferably carbodiimide-, uretoneimine- and/or urethane-containing diisocyanates and/or polyisocyanates. Specific examples are urethane-containing prepolymers containing from 14 to 2.8% by weight, preferably from 12 to 3.5% by weight, of NCO, or quasi-prepolymers containing from 35 to 14% by weight, preferably from 34 to 22% by weight, of NCO, urethane-modified polyisocyanates made from tolylene diisocyanates containing, in particular, from 34 to 28% by weight of NCO, and those made from 4,4'-MDI, 4,4'- and 2,4'-MDI isomer mixtures or crude MDI containing, in particular, from 28 to 14% by weight, particularly preferably from 28 to 22% by weight, of NCO, based on the total weight, and being prepared by reacting diols, oxalkylene glycols and/or polyoxyalkylene glycols having molecular weights of from 62 to 6000, preferably from 134 to 4200, with tolylene diisocyanates, 4,4'-MDI, MDI isomer mixtures and/or crude MDI, for example at from 20° to 110° C., preferably from 50° to 90° C., specific examples of oxalkylene glycols and polyoxyalkylene glycols, which may be employed individually or as mixtures, being diethylene glycol, dipropylene glycol, polyoxyethylene glycol, polyoxypropylene glycol and polyoxypropylene-polyoxyethylene glycol, and carbodiimide- and/or uretoneimine-containing polyisocyanates, eg. based on MDI isomers and/or tolylene diisocyanates.

However, particularly successful and therefore preferred are 2,4-tolylene diisocyanate, 2,6-tolylene diisocyanate, mixtures of 2,4- and 2,6-tolylene diisocyanates and in particular mixtures of 4,4'- and 2,4'-MDI, crude MDI containing 50% by weight or more, based on the total weight, of MDI, mixtures of 4,4'- and 2,4'-MDI and 2,4- and 2,6'-TDI mixtures, mixtures of crude MDI and 2,4- and 2,6-TDI mixtures, and urethane-containing polyisocyanate mixtures containing from 28 to 14% by weight, based on the total weight, of NCO and prepared from MDI and/or crude MDI and polyoxypropylene glycols having a molecular weight of from 134 to 4200 or polyoxypropylene-polyoxyethylene-polyols containing a maximum of 35% by weight of ethylene oxide and having a molecular weight of from 134 to 4200, preferably from 1800 to 4200.

b) The high-molecular-weight compound containing at least two reactive hydrogen atoms (b) is, in particular, a polyether-polyol, expediently having a mean functionality of from 2.0 to 4.0, preferably from 2.0 to 3.0, in particular from 2.0 to 2.4, and a mean molecular weight of from 2200 to 8000, preferably from 3600 to 6500. Mixtures of polyether-polyols and polyether-polyamines containing a maximum of 35% by weight, preferably from 0.5 to 12% by weight, based on the total weight, of polyether-polyamine are also suitable. Polyether-polyols having a molecular weight of less than 2200, for example from 250 to 2200, are also suitable. However, these are expediently employed only in such amounts and mixed with high-molecular-weight polyether-polyols so that mixtures having mean molecular weights of at least 2200 result.

Suitable polyether-polyols can be prepared by a conventional process, for example by anionic polymerization using alkali metal hydroxides, such as sodium hydroxide or potassium hydroxide, or alkali metal alkoxides, such as sodium methoxide, sodium ethoxide, potassium ethoxide or potassium isopropoxide, as catalyst and with addition of one or more initiator molecule which contains from 2 to 4, preferably 2 or 3, reactive hydrogen atoms in bound form, or by cationic polymerization using Lewis acids, such as antimony pentachloride, boron fluoride etherate, inter alia, or bleaching earth as catalyst from one or more alkylene oxides having from 2 to 4 carbon atoms in the alkylene moiety.

Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides may be used individually, alternately one after the other or as a mixture. Examples of suitable initiator molecules are water, organic dicarboxylic acids, such as succinic acid, adipic acid, phthalic acid and terephthalic acid, aliphatic and aromatic, unsubstituted or N-monosubstituted or N,N- or N,N'-dialkyl-substituted diames having from 1 to 4 carbon atoms in the alkyl moiety, such as unsubstituted, monoalkyl-substituted or dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-tolylenediamine and 4,4'-, 2,4'- and 2,2'-diaminodiphenylmethane.

Other suitable initiator molecules are alkanolamines, dialkanolamines and/or trialkanolamines, such as ethanolamine, diethanolamine, N-methyl- and N-ethylethanolamine, N-methyl- and N-ethyldiethanolamine and triethanolamine, and ammonia. Preference is given to polyhydric, in particular dihydric and/or trihydric alcohols and/or alkylene glycols, such as ethanediol, 1,2-and 1,3-propanediol, diethylene glycol, dipropylene glycol, 1,4-butanediol, 1,6-hexanediol, glycerol, trimethylolpropane and pentaerythritol.

The polyether-polyols, preferably polyoxypropylene-polyols and polyoxypropylene-polyoxyethylene-polyols, have, as stated above, a functionality of from 2 to 4, preferably from 2 to 3.0, in particular from 2 to 2.4, and a molecular weight of from 2200 to 8000, preferably from 3600 to 6500, in particular from 3900 to 6000, and suitable polyoxytetramethylene glycols have a molecular weight of up to approximately 3500, preferably from 250 to 2200. Particular preference is given to polyoxypropylene-polyoxyethylene-polyols containing more than 50%, preferably more than 70%, of terminal primary hydroxyl groups.

Other suitable polyether-polyols are polymer-modified polyether-polyols, preferably graft polyether-polyols, which can be prepared by in-situ polymerization of olefinically unsaturated monomers or monomer mixtures, eg. styrene, acrylonitrile or preferably styrene/acrylonitirle mixtures, in polyether-polyols, eg. the above-described polyether-polyols, by a method similar to that of German Patents 11 11 394, 12 22 669 (U.S. Pat. Nos. 3,304,273, 3,383,351 and 3,523,093), 11 52 536 (GB 1,040,452) and 11 52 537 (GB 987 618), or by dispersion of graft polymers which had previously been prepared by free-radical polymerization in solvents, in polyether-polyols by a method similar to that of U.S. Pat. Nos. 3,391,092, 4,014,846 and 4,093,573. Suitable polyether-polyols for the preparation of graft polyether-polyols are either the abovementioned saturated polyether-polyols, which, according to U.S. Reissue Pat. No. 28,715, are essentially free from ethylenically unsaturated units, or olefinically unsaturated polyether-polyols, as described, for example in U.S. Pat. No. 3,652,659 and in U.S. Reissue Pat. No. 29,014. Other suitable polymer-modified polyoxyalkylene-polyols are polyurethane/polyether-polyol dispersions containing tert-amino groups in bound form, as described, for example, in DE-A-32 31 497. The polymer-modified polyoxyether-polyols, which expediently contain from 2 to 35% by weight, preferably from 3 to 25% by weight, based on the total weight, of polymer particles, can, like the polyoxyalkylene-polyols, be employed individually or in the form of mixtures.

Success has been achieved, for example, using polyether-polyol mixtures (b) comprising b1) a high-molecular-weight polyether-polyol having a mean functionality of from 2 to 3, and b2) a high-molecular-weight polymer-modified polyether-polyol having a mean functionality of from 2 to 3, selected from the group comprising polyurethane/polyether-polyol dispersions containing tert-amino groups in bound form and/or in particular graft polyether-polyols. According to a preferred embodiment, the polyol mixture (b) expediently comprises b1) 60% by weight or more, preferably from 75 to 99.9% by weight, based on the weight of the mixture b), of one or more polyether-polyols having a mean functionality of from 2 to 3, in particular from 2 to 2.4, and a mean molecular weight of from 3600 to 6500, in particular from 3900 to 6000, and b2) less than 40% by weight, preferably from 25 to 0.1% by weight, based on the weight of the mixture (b), of one or more polymer-modified polyether-polyols having a mean functionality of from 2 to 3, in particular from 2 to 2.4, and a mean molecular weight of from 3600 to 6500, in particular from 3900 to 6000, selected from the group comprising polyurethane/polyether-polyol dispersions containing tert-amino groups in bound form, preferably graft polyether-polyols or a mixture thereof.

c) The flame-resistant soft PU foams or soft PU foam moldings are expediently prepared in the additional presence of a chain extender and/or crosslinking agent (c), which can be a polyfunctional, in particular difunctional or trifunctional compound having a molecular weight of from 18 to approximately 400, preferably from 62 to approximately 300, for example a dialkanolamine and/or trialkanolamine, eg. diethanolamine or triethanolamine, an aliphatic diol and/or triol having from 2 to 6 carbon atoms in the alkylene moiety, eg. ethanediol, 1,4-butanediol, 1,5-pentanediol, 1,6-hexanediol, glycerol and/or trimethylolpropane, water and low-molecular-weight ethoxylation and/or propoxylation products prepared from one of said dialkanolamines, trialkanolamines, diols and/or triols and an aliphatic and/or aromatic diamine, eg. 1,2-ethanediamine, 1,4-butanediamine, 1,6-hexanediamine, 2,4- and/or 2,6-tolyenediamine, 4,4'-diaminodiphenylmethane, 3,3'-di- and/or 3,3',-5,5'-tetraalkyl-substituted 4,4'-diaminodiphenylmethane as initiator and alkylene oxide or alkylene oxide mixtures.

The chain extender (c) used is preferably a dialkanolamine, diol and/or triol and in particular ethanediol, 1,4-butanediol, 1,6-hexanediol, diethanolamine, trimethylolpropane or glycerol, or a mixture of two or more of said compounds. The chain extender and/or crosslinking agent is expediently used in such an amount that from 0 to 25 parts by weight, preferably from 4 to 10 parts by weight, of component (c) are present in the reaction mixture per 100 parts by weight of the high-molecular-weight compound containing at least two reactive hydrogen atoms (b).

d) In order to increase the flame resistance and simultaneously reduce the smoke density in the event of fire, the flameproofing agent (d) used according to the invention in the preparation of the soft PU foams is melamine and expandable graphite in effective amounts. The melamine and the expandable graphite can be employed in a commercially available form for this purpose.

The melamine used expediently has a mean particle size of from 5 to 50 μm and the following particle size distribution:

10% by weight of the particles are larger than 30μm
30% by weight of the particles are larger than 24μm
50% by weight of the particles are larger than 20μm
70% by weight of the particles are larger than 16μm
90% by weight of the particles are larger than 11μm A particularly successful melamine, and one which is therefore preferred, has a mean particle size of from 16 to 50 μm, in particular from 20 to 40 μm, and a bulk density of from 300 to 800 g/l, in particular from 500 to 650 g/l. The melamine is expediently used in an amount of from 5 to 100 parts by weight, preferably from 35 to 80 parts by weight, in particular from 45 to 65 parts by weight, per 100 parts by weight of the high-molecular-weight compound containing at least two reactive hydrogen atoms (b).

In order to stabilize the melamine in the high-molecular weight polyether-polyols and to improve the processing properties of the formulation, an expandable graphite is expediently used in which 95% by weight of the particles have a mean particle size of less than 0.5 mm. Particularly suitable, and therefore preferred, are expandable graphite flakes which have the following particle size distribution:

approximately 10% by weight of the particles are smaller than 0.15 mm, approximately 35% by weight of the particles are from 0.15 to 0.25 mm, approximately 50% by weight of the particles are from 0.25 to 0.50 mm, and approximately 5% by weight of the particles are larger than 0.50 mm.

The expandable graphite is expediently employed in an amount of from 0.1 to 35 parts by weight, preferably from 1 to 25 parts by weight, in particular from 6 to 18 parts by weight, per 100 parts by weight of the high-molecular-weight compound containing at least two reactive hydrogen atoms (b), the surprising synergistic effect due to the addition of relatively small amounts of expandable graphite meaning that the flame resistance effected by the melamine can be significantly improved.

The flameproofing agents usually used for the preparation of the flamed-resistant soft PU foams or preferably soft PU foam moldings by the process according to the invention are melamine and expandable graphite. In order to achieved specific effects, eg. homogenization and/or stabilization of the starting component mixture, extension of the processing range, for example with respect to the reaction parameters and the foaming equipment, the processing reliability, the demolding behavior, the specific improvements in particular mechanical properties, inter alia, it may be advantageous to combine the mixture of melamine and expandable graphite with other organic or inorganic flameproofing agents so that the latter may, if desired, be employed in reduced amounts.

Examples of suitable further flameproofing agents, which can be used in amounts of from 0 to 15 parts by weight, preferably from 0.5 to 8 parts by weight, based on 100 parts by weight of the high-molecular-weight compound containing at least two reactive hydrogen atoms (b), are starch, expediently selected from the group comprising corn starch, rice starch, potato starch and wheat starch, or mixtures thereof, and chemically modified or unmodified starch derivatives, phosophorus compounds, eg. tricresyl phosphate, tris(2-chloroethyl) phosphate, tris(2-chloropropyl) phosphate, tris(1,3-dichloropropyl) phosphate, tris(2,3-dibromopropyl) phosphate and tetrakis (2-chloroethyl)ethylene diphosphate, and inorganic salts, eg. antimony trioxide, aluminum oxide, hydrate, ammonium sulfate, calcium sulfate, ammonium phosphates and preferably modified or unmodified ammonium polyphosphates.

The ammonium polyphosphate used is, in particular, a modified, finely particulate, sparingly soluble compound of the formula $$H_{(n-m)+2}(NH)_mP_nO_{3n+1}$$

where n is an integer having a mean of from about 20 to 800, preferably approximately 700, and the m:n ratio is about 1, and the modification comprises from about 80 to 99.5% by weight of the abovementioned ammonium polyphosphate and from about 0.5 to 20% by weight of a cured epoxy resin which has an epoxide equivalent weight of from about 170 to about 220 and encapsulates the individual ammonium polyphosphate particles. Ammonium polyphosphates of this type can be obtained, for example, from Hoechst Aktiengesellschaft under the tradename Exolit®.

The following have proven successful flameproofing agents (d) and are therefore preferred:

di) from 5 to 100 parts by weight, preferably from 35 to 80 parts by weight, in particular from 45 to 65 parts by weight, of melamine, dii) from 0.1 to 35 parts by weight, preferably from 1 to 25 parts by weight, in particular from 6 to 18 parts by weight, of expandable graphite and diii) from 0.5 to 15 parts by weight, preferably from 0.5 to 8 parts by weight, in particular from 3 to 8 parts by weight, of at least one further flameproofing agent, in particular ammonium polyphosphate, per 100 parts by weight of the high-molecular weight compound containing at least two reactive hydrogen atoms (b).

In order to simplify handling and to ease processing, dispersions can be prepared from the flameproofing agent and the high-molecular-weight compound containing at least two reactive hydrogen atoms. Melamine/expandable graphite/polyether-polyol dispersions of this type which are preferred comprise from 5 to 100 parts by weight, preferably from 35 to 80 parts by weight, in particular from 45 to 65 parts by weight, of melamine, from 0.1 to 35 parts by weight, preferably from 1 to 25 parts by weight, in particular from 6 to 18 parts by weight, of expandable graphite and 100 parts by weight of one or more polyether-polyols or polymer-modified polyether-polyols, or a mixture thereof, having a functionality of from 2 to 3 and a molecular weight of from 3600 to 6500. It is advantageous here if the blowing agent (e), the catalyst (f) and, if used, the assistants and/or additives (g) can easily be incorporated into the dispersions or for the melamine/expandable graphite/polyether-polyol dispersion to be fed separately to the mixer, preferably the mixing head, and simultaneously metered in.

e) Blowing agents (e) which can be used to prepare the soft PU foams preferably include water, which reacts with isocyanate groups to form carbon dioxide as the blowing gas. The amount of water expediently employed is from 0.1 to 8 parts by weight, preferably from 1.0 to 3.5 parts by weight, in particular from 2.0 to 3.0 parts by weight, based on 100 parts by weight of the high-molecular weight compound containing at least two reactive hydrogen atoms (b).

Physical blowing agents mixed with water or as the only blowing agent can also be employed, but the flame-resistant soft structural PU foams are preferably prepared exclusively using physical blowing agents. Suitable agents are liquids which are inert to the organic, unmodified or modified polyisocyanates (a) and have boiling points below 100° C., preferably below 50° C., in particular of from −50° C. to 30° C., at atmospheric pressure, so that they evaporate under the effect of the exothermic polyaddition reaction. Examples of preferred liquids of this type are hydrocarbons, such as n- and isopentane, technical-grade pentane mixtures, n- and isobutane and propane, ethers such as furan, dimethyl ether and diethyl ether, ketones, such as acetone and methyl ethyl ketone, esters, such as ethyl acetate and methyl formate, and preferably halogenated hydrocarbons, such as methylene chloride, difluromethane, trichlorofluoromethane, dichlorodifluoromethane, dichloromonofluoromethane, 1,1,1-dichlorofluoroethane, 1,1,1-chlorodifluoroethane, dichlorotetrafluoroethane, tetrafluoroethane, 1,1,2-trichloro-1,2,2-trifluoroethane and heptafluoropropane, and noble gases, eg. krypton. Mixtures of these low-boiling liquids with one another and/or with other substituted or unsubstituted hydrocarbons can also be used.

The necessary amount of physical blowing agent can be determined simply depending on the foam density required and is from 0 to about 30 parts by weight, preferably from 0 to 20 parts by weight, per 100 parts by weight of the high-molecular-weight compound (b), its amount being reduced proportionately when water is also used. It may be expedient to mix the modified or unmodified polyisocyanate (a) with the physical blowing agent, thus reducing its viscosity.

f) In order to accelerate the reaction between the high-molecular-weight compound containing at least two reactive hydrogen atoms (b), the hydroxyl-containing chain extender or crosslinking agent and water as blowing agent (e) and the organic polyisocyanate and/or modified polyisocyanate (a), a conventional polyurethane catalyst is introduced into the reaction mixture. Preference is given to a basic polyurethane catalyst, for example tertiary amines, such as dimethylbenzylamine, dichclohexylmethylamine, dimethylcyclohexylamine, N,N,N',N'-tetramethyldiaminodiethyl ether, bis(dimethylaminopropyl)urea, N-methyl- and N-ethylmorpholine, dimethylpiperazine, N-dimethylaminoethylpiperidine, 1,2-dimethylimidazole, 1-azabicyclo[2.2.0]octane, dimethylaminoethanol, 2-(N,N-dimethylamionethoxy) ethanol, N,N',N'-tris(dialkylaminoalkyl) hexahydrotriazine, eg. N,N',N'-tris(dimethylaminopropyl)-s-hexahydrotriazine, di(4-dimethylaminocyclohexyl)methane and in particular triethylenediamine. However, it is also possible to use metal salts, such as iron(II) chloride, zinc chloride, lead octanoate and preferably tin salts, such as tin dioctanoate, tin diethylhexanoate and dibutyltin dilaurate, and, in particular, mixtures of tertiary amines and organic tin salts. Particular success has been achieved using a catalyst combination which contains, as essential components, triethylenediamine, bis(dimethylaminoethyl) ether, 2-(dimethylaminoethoxy) ethanol, dibutyltindilaurate and dibutyldilauryltin mercaptide, preferably in a weight ratio of from 0.2 to 1.5:0.1 to 0.2:0.1 to 0.25:0.1 to 0.3:0.05 to 0.15.

It is expedient to employ from 0.1 to 10% by weight, preferably from 0.3 to 3% by weight, of catalyst based on tertiary amines and/or from 0.01 to 0.5% by weight, preferably from 0.03 to 0.25% by weight, of metal salts or from 0.1 to 5% by weight, preferably from 0.3 to 3.5% by weight, of said catalyst combination, based on the weight of the high-molecular-weight compound (b).

g) The reaction mixture may also contain auxiliaries and/or additives (g), for example surface-active substances, stabilizers, hydrolysis-protecting agents, pore regulators, fungistatic and bacteriostatic substances, dyes, pigments and fillers.

Examples of suitable surface-active substances are those which serve to support homogenization of the starting materials and may also be suitable for regulating the cell structure of the foams. Specific examples are siloxane-oxyalkylene copolymers and other organopolysiloxanes, oxyethylated alklyphenols, oxyethylated fatty alcohols, paraffin oils, castor oil or ricinoleic acid esters and turkey red oil, which are used in amounts of from 0.05 to 8 parts by weight, preferably from 0.4 to 5 parts by weight, per 100 parts by weight of the high-molecular-weight compound (b).

Further details on the abovementioned conventional auxiliaries and additives can be obtained from the specialist literature, for example from the monograph by J. H. Saunders and K. C. Frisch, High Polymers, Volume XVI, Polyurethanes, Parts 1 and 2, Interscience Publishers, 1962 and 1964 respectively, or Kunststoff-Handbuch, Polyurethane, Volume VII, Hanser-Verlag, Munich, Vienna, 1st and 2nd Editions, 1966 and 1983.

To prepare the soft PU foams or soft PU foam moldings, the organic, modified or unmodified polyisocyanate (a), the high-molecular-weight compound containing at least two reactive hydrogen atoms (b) and, if desired, the chain extender and/or crosslinking agent (c) are reacted in the presence of a flameproofing agent (d), blowing agent (e), catalyst (f) and, if desired, auxiliaries and/or additives (g) at from 0° to 100° C., preferably from 15° to 80° C., in such mixing ratios that from 0.5 to 2, preferably from 0.8 to 1.3, in particular approximately one, reactive hydrogen atom(s) is bonded to the starting components (b) and (c) per NCO group, and, if water is employed as the blowing agent, the molar ratio between the number of equivalents of water and the number of equivalents of NCO groups is from 0.5 to 5:1, preferably from 0.7 to 0.95:1, in particular from 0.75 to 0.85:1.

The soft PU foams or soft PU foam moldings are expediently prepared by the one-shot process by mixing two components A and B, the starting components (b) to (f) and, if used, (g) being combined to form component A and the starting component (a), if desired mixed with (d), (g) and an inert physical blowing agent being used as component B. Thus, it is only necessary to mix components A and B vigorously before preparing the soft PU foams. The reaction mixture can be foamed in open or closed molds and to give slabstock form.

To produce soft PU foam moldings, the reaction mixture is heated to from 15° to 80° C., preferably from 23° to 65° C., in an expediently heatable metallic mold. The mold temperature is usually from 20° C. to 90° C., preferably from 35° to 70° C. The reaction mixture can be cured in the closed mold with, for example, from 1.1- to 6-fold, preferably from 1.1- to 1.5-fold compression.

The soft PU foam and moldings prepared by the process according to the invention have a density of from 30 to 150 g/l, preferably from 40 to 100 g/l. They have good flame resistance, passing the kerosine burner test (FAR 25.853 C), have low smoke density in accordance with ASTM E 662-79, and have a good range of mechanical properties. The foam is preferably used as a cushioning material, for example as seat cushions, armrests, headrests, sun visors and safety covers in vehicle passenger compartments, preferably motor vehicles and aircraft. In particular, flame-resistant aircraft seats having densities of from 30 to 100 g/l are produced.

The melamine/expandable graphite/polyether-polyol dispersions are used to produce compact or cellular polyisocyanate polyaddition products, for example for the preparation of urethane-, isocyanurate- or urethane- and isocyanurate-containing flexible, semi-rigid or rigid foams, compact or cellular elastomers and preferably flame-resistant soft PU foams, soft slabstock PU foams and, in particular, soft PU foam moldings.

In the examples, parts are by weight.

EXAMPLE

Component A:

A mixture comprising

| | |
|---|---|
| 37.68 | parts of a glycerol-initiated polyoxypropylene (86% by weight)-polyoxyethylene (14% by weight)-polyol having a mean molecular weight of 6000, |
| 4.99 | parts of a trimethylolpropane-initiated graft polyoxypropylene (84% by weight)-polyoxyethylene (16% by weight)-polyol having a mean molecular weight of approximately 6000 and a graft polymer content of 20% by weight, based on the total weight, and prepared using an acrylonitrile/-styrene mixture for grafting (Bayfit ® 3699 from Bayer AG), |
| 9.97 | parts of a polyoxypropylene (81% by weight)-polyoxyethylene (19% by weight) glycol having a mean molecular weight of approximately 3900 and prepared using dipropylene glycol as the initiator molecule, |
| 0.6 | part of silicone stabilizer (Silicone DC 5043 from Dow Corning), |
| 0.3 | part of silicone stabilizer (Tegostab ® B 8631 from Goldsmidt), |
| 0.83 | part of triethylenediamine (Dabco ® X 540 from Air Products), |
| 0.078 | part of bis(dimethylaminoethyl) ether, |
| 0.1 | part of 2-(dimethylaminoethoxy)ethanol, |
| 0.05 | part of dibutyltin dilaurate, |
| 0.025 | part of dibutyldilauryltin mercaptide, |
| 1.0 | part of 1,6-hexanediol, |
| 1.19 | parts of water, |
| 5.607 | parts of trichlorofluoromethane, |
| 28.6 | parts of melamine having a bulk density of 600 g/l, |
| 6.17 | parts of expandable graphite (Sigraflex ® FR 90-60/80 Sigri GmbH) and |
| 2.81 | parts of ammonium polyphosphate (Exolit ® 422 from Hoechst AG, Hürth). |

Component B:

A urethane-containing quasi-prepolymer containing 31% by weight of NCO and having a viscosity of 52 mPa.s at 25° C. and prepared from a 2,4-/2,6-tolylene diisocyanate isomer mixture in a weight ratio 80:20 and a polyoxypropylene-polyoxyethylene glycol having a molecular weight of 3900.

| | |
|---|---|
| 100 | parts of component A and |
| 25 | parts of component B were mixed vigorously at 23° C., corresponding to an NCO index of 100, and |
| 1150 | g of this reaction mixture were introduced into a metallic mold held at 50° C. with internal dimensions 40 × 40 × 10 cm, the mold was closed, and the reaction mixture was allowed to cure. |

The molding was removed after 10 minutes and then stored at room temperature for 24 hours.

The following mechanical properties were measured on the flame-resistant molding:

| | |
|---|---|
| Density [g/l]: | 72 |
| Tensile strength in accordance with DIN 53571 [k/Pa]: | 113 |
| Elongation in accordance with DIN 53571 [%]:1 | 167 |
| Tear propagation strength in accordance with DIN 53575 [N/mm]: | 0.59 |
| Compressive set in accordance with DIN 53572 [%]: | 11 |
| Kerosine burner test in accordance with FAR 25 853 C, weight loss [%]: | 4.52 |

COMPARATIVE EXAMPLE 1

Component A:

As in the example, but with the expandable graphite replaced by 34.77 parts by weight of melamine.

Component B:

As in the example

The molding was produced as described in the example.

Comparison of the results of the kerosine burner test in accordance with FAR 25 853 C A comparative kerosine burner test with the results below was carried out in accordance with the provisions of the Federal Aviation Regulation (FAR):

| Molding from | Comparative Example I | Example |
|---|---|---|
| Weight[1] [g] | 2741 | 3100 |
| after test [g] | 2477 | 2890 |
| weight loss [%] | 9.63 | 6.77 |
| Weight[2] [g] | 3557 | 3493 |
| after test [g] | 3261 | 3335 |
| weight loss [%] | 8.32 | 4.52 |

[1]weight is the sum of the cushion and back part
[2]weight is the sum of the cushion and back part and the fabric (wool)

ASTM E 662-79 standard test method for SPECIFIC OPTICAL DENSITY OF SMOKE GENERATED BY SOLID MATERIALS (smoke density in accordance with ATS 1000.001)

The permissible values of Ds with and without flame treatment must not exceed 100 after 1.5 minutes and 200 after 4 minutes. The table below shows the results measured on moldings produced as per the example and Comparative Example L Measurement of the smoke density in accordance with ATS 1000.001

Charring without flame treatment

| | Ds (specific optical density) after an experimental duration of t (min) | |
|---|---|---|
| | 1.5 min | 4.0 min |
| Comparative Example I | 69 | 160 |
| Example | 84 | 169 |

Charring with flame treatment

|  | Ds (specific optical density) after an experimental duration of t (min) | |
|---|---|---|
|  | 1.5 min | 4.0 min |
| Comparative Example I | 116 | 222 |
| Example | 18 | 132 |

COMPARATIVE EXAMPLE II

Component A:

As in the example, but with the melamine replaced by 34.77 parts by weight of expandable graphite.

A highly pasty material was obtained which was not homogeneously miscible and was therefore impossible to process to give a polyurethane foam.

COMPARATIVE EXAMPLE III

Component A:

Similar to Example 1, but without the addition of melamine and ammonium polyphosphate: instead, 30 parts by weight of foamed graphite were used.

There was obtained an inhomogeneous, highly pasty material, which could not be processed into a polyurethane foam.

COMPARATIVE EXAMPLE IV

Component A:

Similar to Example 1, but without the addition of foamed graphite and ammonium polyphosphate: instead, 30 parts by weight of melamine were used.

COMPARATIVE EXAMPLE V

Component A:

Similar to Example 1, but without the addition of melamine and ammonium polyphosphate: instead, 15 parts by weight of foamed graphite were used.

COMPARATIVE EXAMPLE VI

Component A:

Similar to Example 1, but without the addition of melamine: instead, 30 parts by weight of foamed graphite and 2.5 parts by weight of ammonium polyphosphate were used.

There was obtained an inhomogeneous, highly pasty material, which could not be processed into a polyurethane foam.

COMPARATIVE EXAMPLE VII

Component A:

Similar to Example 1, but without the addition of foamed graphite: instead, 30 parts by weight of melamine and 2.5 parts by weight of ammonium polyphosphate were used.

A comparative kerosine burner test was carried out on the resultant polyurethane foams in accordance with the FAR specifications. The following results were obtained:

|  | Comparative Example | | |
|---|---|---|---|
|  | IV | V | VII |
| Weight loss [%] | 13.4 | 13.6 | 9.2 |

We claim:

1. A process for the preparation of a flame-resistant, soft polyurethane foam having reduced smoke density, comprising reacting
    a) an isocyanate component comprising an organic polyisocyanate and/or a modified organic polyisocyanate with
    b) a polyol component consisting essentially of a high-molecular-weight polyether polyol containing at least two reactive hydrogen atoms, polyurethane/polyether-polyol dispersions, graft polyether-polyols, or mixtures thereof, and
    c) optionally, a low-molecular-weight chain extender, in the presence of
    d) a flameproofing agent,
    e) a blowing agent,
    f) a catalyst and, optionally
    g) assistants and/or additives,
wherein the flameproofing agent (d) comprises, based on 100 parts by weight of the polyol component (b):
    di) from 5 to 100 parts by weight of melamine,
    dii) from 0.1 to 35 parts by weight of expandable graphite, and
    diii) from 0.5 to 15 parts by weight of a modified or unmodified ammonium polyphosphate.

2. A process as claimed in claim 1, wherein the flameproofing agent (d) is
    di) from 45 to 65 parts by weight of melamine,
    dii) from 6 to 18 parts by weight of expandable graphite and
    diii) from 0 to 8 parts by weight of ammonium polyphosphate per 100 parts by weight of the high-molecular-weight compound containing at least two reactive hydrogen atoms (b).

3. A process as claimed in claim 1, wherein the melamine has a mean particle size of from 20 to 40 µm and a bulk density of from 500 to 650 g/l.

4. A process as claimed in claim 1, wherein approximately 95% by weight of the expandable graphite has a mean particle size of less than 0.5 mm.

5. A process as claimed in claim 1, wherein the flameproofing agent d(iii) is a modified ammonium polyphosphate of the general formula $$H_{(n-m)+2}(NH_4)_m P_n O_{3n+1}$$

where n is an integer having a mean of from about 20 to 800, and the m:n ratio is about 1, and the modified ammonium polyphosphate comprises from about 80 to 99.5% by weight of ammonium polyphosphate and from about 0.5 to 20% by weight of a cured epoxy resin which has an epoxide equivalent weight of from about 170 to about 220 and encapsulates the individual ammonium polyphosphate particles.

6. A process as claimed in claim 1, wherein the high-molecular-weight compound (b) is a mixture which contains
    b1) 60% by weight or more, based on the weight of the mixture (b), of one or more polyether-polyols having a mean functionality of from 2 to 3 and a mean molecular weight of from 3600 to 6500, and b2) less than 40% by weight, based on the weight of the mixture (b), of one or more polymer-modified polyether-polyol having a mean functionality of from 2 to 3 and a mean molecular weight of from 3600 to 6500, selected from the group comprising graft polymer-polyols and polyurethane/polyether-polyol dispersions containing tert-amino groups in bound form, or a mixture thereof.

7. A melamine/expandable graphite/polyether-polyol dispersion comprising:

from 5 to 100 parts by weight of melamine, from 0.1 to 35 parts by weight of expandable graphite, from 0.5 to 15 parts by weight of a modified or unmodified ammonium polyphosphate, and 100 parts by weight of a polyol component consisting essentially of one or more polyether-glycols, polymer modified polyols selected from the group consisting of graft polyether-polyols and polyurethane/polyether polyol dispersions, or a mixture thereof, having a functionality of from 2 to 3 and a molecular weight of from 3600 to 6500.

8. A process for the preparation of a flame-resistant, soft polyurethane foam having reduced smoke density, comprising reacting a) an isocyanate component comprising an organic polyisocyanate and/or a modified organic polyisocyanate with b) a polyol component comprising a high-molecular-weight compound containing at least two reactive hydrogen atoms, and c) optionally, a low-molecular-weight chain extender, in the presence of d) a flameproofing agent, e) a blowing agent f) a catalyst and, optionally g) assistants and/or additives, wherein the flameproofing agent (d) comprises, per 100 parts by weight of the polyol component (b):

di) from 5 to 100 parts by weight of melamine, dii) from 0.1 to 35 parts by weight of expandable graphite, and diii) from 0.5 to 15 parts by weight of a modified or unmodified ammonium polyphosphate.

9. A process as claimed in claim 8, wherein the flameproofing agent (d) comprises di) from 45 to 65 parts by weight of melamine, dii) from 6 to 18 parts by weight of expandable graphite and diii) from 3 to 8 parts by weight of ammonium polyphosphate per 100 parts by weight of the polyol component (b).

10. A process as claimed in claim 8, wherein the melamine has a mean particle size of from 20 to 40 μm and a bulk density of from 500 to 650 g/l.

11. A process as claimed in claim 8, wherein approximately 95 percent by weight of the expandable graphite has a mean particle size of less than 0.5 mm.

12. A process as claimed in claim 8, wherein the flameproofing agent d(iii) is a modified ammonium polyphosphate of the general formula

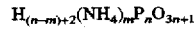

where n is an integer having a mean of from about 20 to 800, and the m:n ratio is about 1, and the modified ammonium polyphosphate comprises from about 80 to 99.5 percent by weight of ammonium polyphosphate and from about 0.5 to 20 percent by weight of a cured epoxy resin which has an epoxide equivalent weight of from about 170 to about 220 and encapsulates the individual ammonium polyphosphate particles.

13. A process as claimed in claim 8, wherein the polyol component (b) comprises a mixture of:

b1) 60 percent by weight or more, based on the weight of the mixture (b), of one or more polyether-polyols having a mean functionality of from 2 to 3 and a mean molecular weight of from 3600 to 6500, and b2) less than 40 percent by weight, based on the weight of the mixture (b), of one or more polymer-modified polyether-polyol having a mean functionality of from 2 to 3 and a mean molecular weight of from 3600 to 6500, selected from the group comprising graft polymer-polyols and polyurethane/polyether-polyol dispersions containing tert-amino groups in bound form, or a mixture thereof.

14. A process for the preparation of a flame-resistant, soft polyurethane foam having reduced smoke density, comprising reacting a) an isocyanate component comprising an organic polyisocyanate and/or a modified organic polyisocyanate with b) a polyol component selected from the group consisting of a high-molecular-weight polyether polyol containing at least two reactive hydrogen atoms, polyurethane/polyether-polyol dispersions, graft polyether-polyols, and mixtures thereof, and c) optionally, a low-molecular-weight chain extender, in the presence of d) a flameproofing agent, e) a blowing agent, f) a catalyst and, optionally g) assistants and/or additives, wherein the flameproofing agent (d) comprises, based on 100 parts by weight of the polyol component (b):

di) from 5 to 100 parts by weight of melamine, dii) from 0.1 to 35 parts by weight of expandable graphite, and diii) from 0.5 to 15 parts by weight of a modified or unmodified ammonium polyphosphate.

15. A process as claimed in claim 14, wherein the flameproofing agent (d) comprises di) from 45 to 65 parts by weight of melamine, dii) from 6 to 18 parts by weight of expandable graphite and diii) from 3 to 8 parts by weight of ammonium polyphosphate per 100 parts by weight of component (b).

16. A process as claimed in claim 14, wherein the melamine has a mean particle size of from 20 to 40 μm and a bulk density of from 500 to 650 g/l.

17. A process as claimed in claim 14, wherein approximately 95 percent by weight of the expandable graphite has a mean particle size of less than 0.5 mm.

18. A process as claimed in claim 14, wherein the flameproofing agent d(iii) is a modified ammonium polyphosphate of the general formula

where n is an integer having a mean of from about 20 to 800, and the m:n ratio is about 1, and the modified ammonium polyphosphate comprises from about 80 to 99.5 percent by weight of ammonium polyphosphate and from about 0.5 to 20 percent by weight of a cured epoxy resin which has an epoxide equivalent weight of from about 170 to about 220 and encapsulates the individual ammonium polyphosphate particles.

19. A process as claimed in claim 14, wherein the polyol component (b) comprises a mixture of:

b1) 60 percent by weight or more, based on the weight of the mixture (b), of one or more polyether-polyols having a mean functionality of from 2 to 3 and a mean molecular weight of from 3600 to 6500, and b2) less than 40 percent by weight, based on the weight of the mixture (b), of one or more polymer-modified polyether-polyol having a mean functionality of from 2 to 3 and a mean molecular weight of from 3600 to 6500, selected from the group comprising graft polyether-polyols and polyurethane/polyether-polyol dispersions containing tert-amino groups in bound form, or a mixture thereof.

* * * * *